United States Patent
Hanson et al.

(10) Patent No.: US 9,981,631 B2
(45) Date of Patent: May 29, 2018

(54) METHODS AND SYSTEMS FOR STARTING A VEHICLE

(71) Applicant: Ford Global Technologies, LLC, Dearborn, MI (US)

(72) Inventors: Ryan Edwin Hanson, Livonia, MI (US); Omar Idris Saleh, Dearborn Heights, MI (US); Elton Salem Jamoua, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/606,199

(22) Filed: May 26, 2017

(65) Prior Publication Data

US 2017/0259783 A1    Sep. 14, 2017

Related U.S. Application Data

(63) Continuation of application No. 14/854,489, filed on Sep. 15, 2015, now Pat. No. 9,663,065.

(51) Int. Cl.
*B60R 25/06*    (2006.01)
*B60R 25/20*    (2013.01)
*B60R 16/02*    (2006.01)

(52) U.S. Cl.
CPC .............. *B60R 25/06* (2013.01); *B60R 16/02* (2013.01); *B60R 25/20* (2013.01)

(58) Field of Classification Search
CPC .......... B60R 25/06; B60R 25/20; B60R 16/02
See application file for complete search history.

(56) References Cited

U.S. PATENT DOCUMENTS

| | | | |
|---|---|---|---|
| 6,190,284 B1 | 2/2001 | Kuroda et al. | |
| 6,653,747 B1 | 11/2003 | Proefke et al. | |
| 7,083,020 B2 | 8/2006 | Morimoto et al. | |
| 9,056,606 B1 | 6/2015 | Rademacher et al. | |
| 2006/0052977 A1 | 3/2006 | Wilson | |
| 2011/0040426 A1 | 2/2011 | Long | |
| 2012/0253552 A1* | 10/2012 | Skelton | B60K 28/063 701/2 |
| 2014/0022070 A1 | 1/2014 | Golomb | |
| 2014/0236461 A1 | 8/2014 | Edgren | |
| 2015/0197205 A1 | 7/2015 | Xiong et al. | |

* cited by examiner

*Primary Examiner* — David J Hlavka
(74) *Attorney, Agent, or Firm* — Julia Voutyras; McCoy Russell LLP

(57) ABSTRACT

Systems and methods for selectively activating operation of one or more vehicle powertrain elements are presented. In one example, a propulsion source of a vehicle is activated in response to a driver moving a shift lever from a first location to a second location. Further, activation of propulsion source may be made contingent on whether or not the vehicle is coupled to an electrical grid.

20 Claims, 7 Drawing Sheets

METHODS AND SYSTEMS FOR STARTING A VEHICLE

CROSS REFERENCE TO RELATED APPLICATIONS

The present application is a continuation of U.S. patent application Ser. No. 14/854,489 entitled "METHODS AND SYSTEMS FOR STARTING A VEHICLE," filed on Sep. 15, 2015. The entire contents of the above referenced application are hereby incorporated by reference in their entirety for all purposes.

FIELD

The present description relates to systems and methods for starting operation of a vehicle. The methods may be particularly useful for vehicles that transport an occupant from one location to another location.

BACKGROUND AND SUMMARY

A vehicle may be started when an operator follows a prescribed sequence of actions. For example, a vehicle may be started after a driver applies a brake pedal and rotates a key switch while the vehicle's transmission is engaged in park or neutral. Operation of the key switch and brake pedal confirm may be used to confirm that the operator is in the vehicle so that an unauthorized operator may not be able to start the vehicle. One additional way to confirm that an authorized operator is within the vehicle is for the vehicle to sense whether or not a key fob or security token is within the vehicle's passenger cabin before the driver rotates the key or presses a start button. A driver may wish to reduce complexity of a vehicle starting sequence, but eliminating steps in the vehicle starting sequence may lower confidence that the vehicle is being started for a the intended operator. Therefore, it may be desirable to reduce complexity of a vehicle's starting sequence while maintaining or improving confidence that the vehicle is being appropriately started.

The inventors herein have recognized the above-mentioned disadvantages and have developed a method for enabling vehicle propulsion, comprising: enabling propulsion of a vehicle after propulsion of the vehicle is deactivated in response to confirming presence of a driver via a polling device, confirming more than a threshold force is applied to a brake pedal, and shifting the vehicle from park or neutral into a forward or reverse propulsion mode.

By enabling propulsion of a vehicle in response to confirming presence of a driver, confirming a threshold force is applied to a brake pedal, and shifting the vehicle from park or neutral into a forward or reverse propulsion mode, it may be possible to provide the technical result of simplifying vehicle activation. In particular, rotation of a key switch or application of a pushbutton start may be omitted while still activating a vehicle for a confirmed operator. Thus, a step in the vehicle activation sequence that was customarily used to engage a starter may be eliminated. The operation of engaging a transmission may be the basis for activating vehicle propulsion. In this way, shifting the transmission may be a basis for entering a forward of reverse propulsion mode and activating the source or sources of propulsion force instead of activating propulsion via a device that only acts to enable propulsion, whereas according to the present method propulsion and transmission operating range is performed at least partially responsive to shifting.

The present description may provide several advantages. Namely, the approach may reduce a driver's perception of vehicle starting complexity. Further, the approach may be applied to both conventional and hybrid vehicles. Further still, the approach may be applied to vehicles that include automatic or manual transmissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
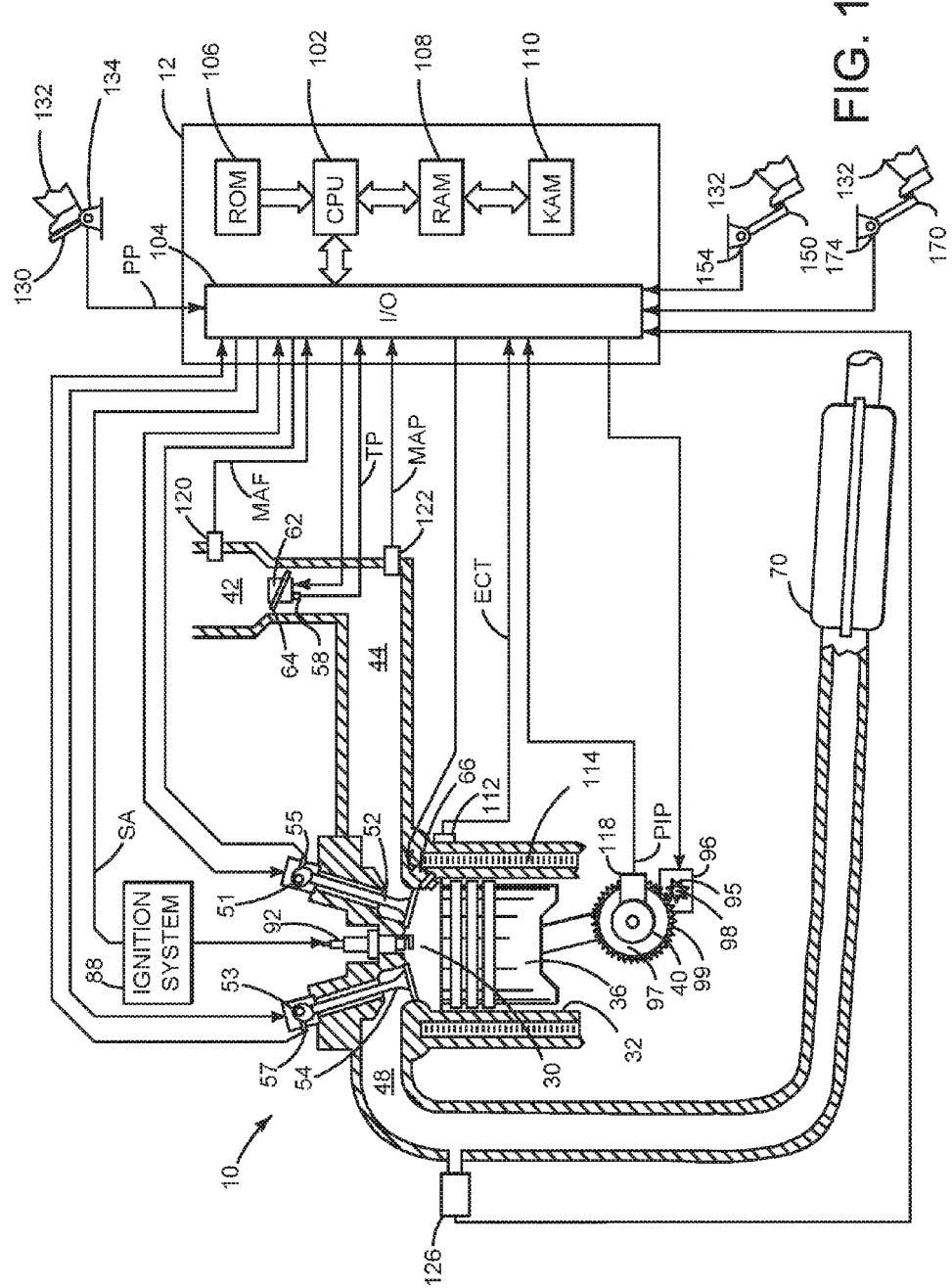
FIG. 1 is a schematic diagram of an engine.
Figure 2A:
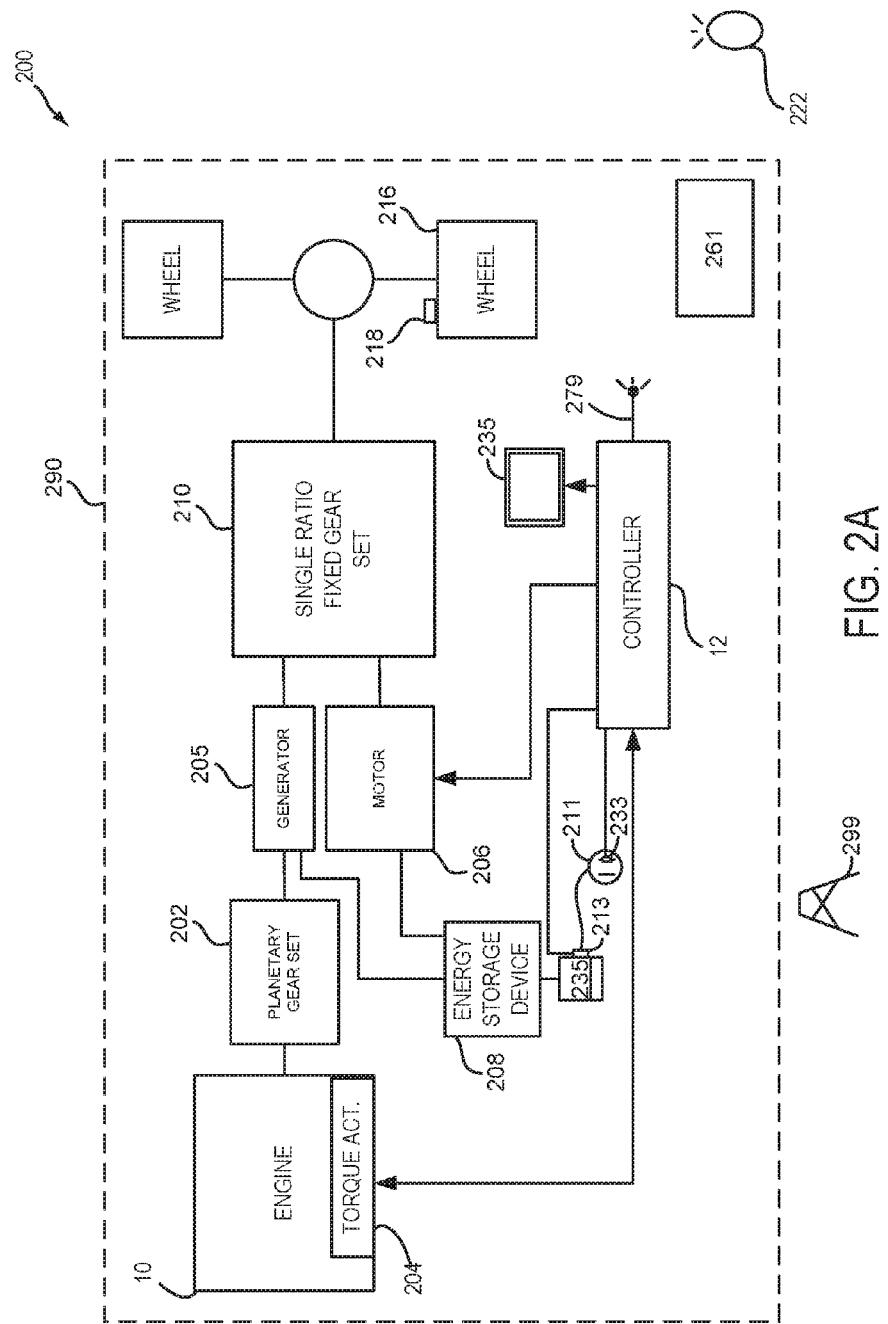
FIGS. 2A, 2B, and 2C show example vehicle driveline configurations.
Figure 2B:
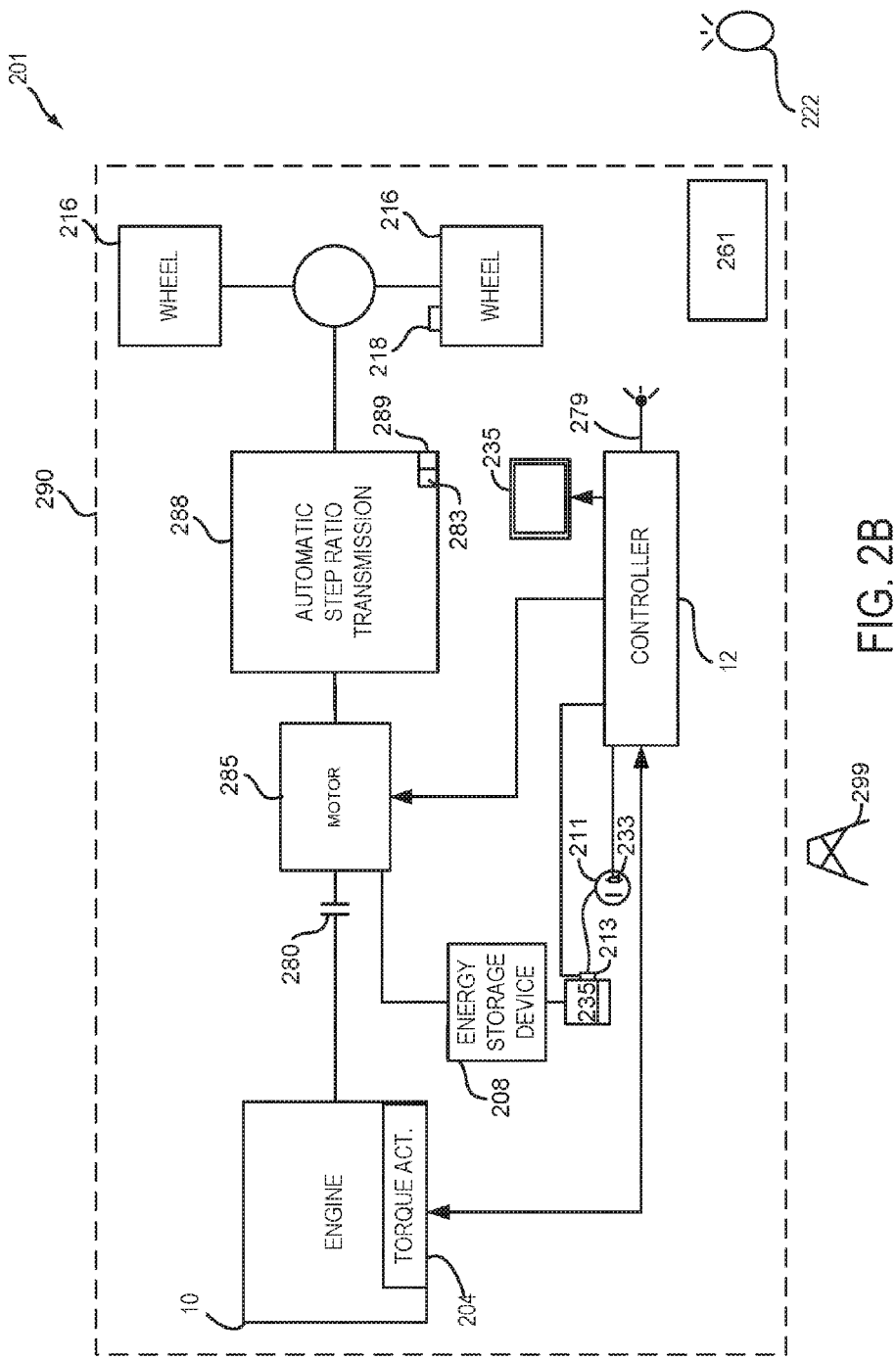
Figure 2C:
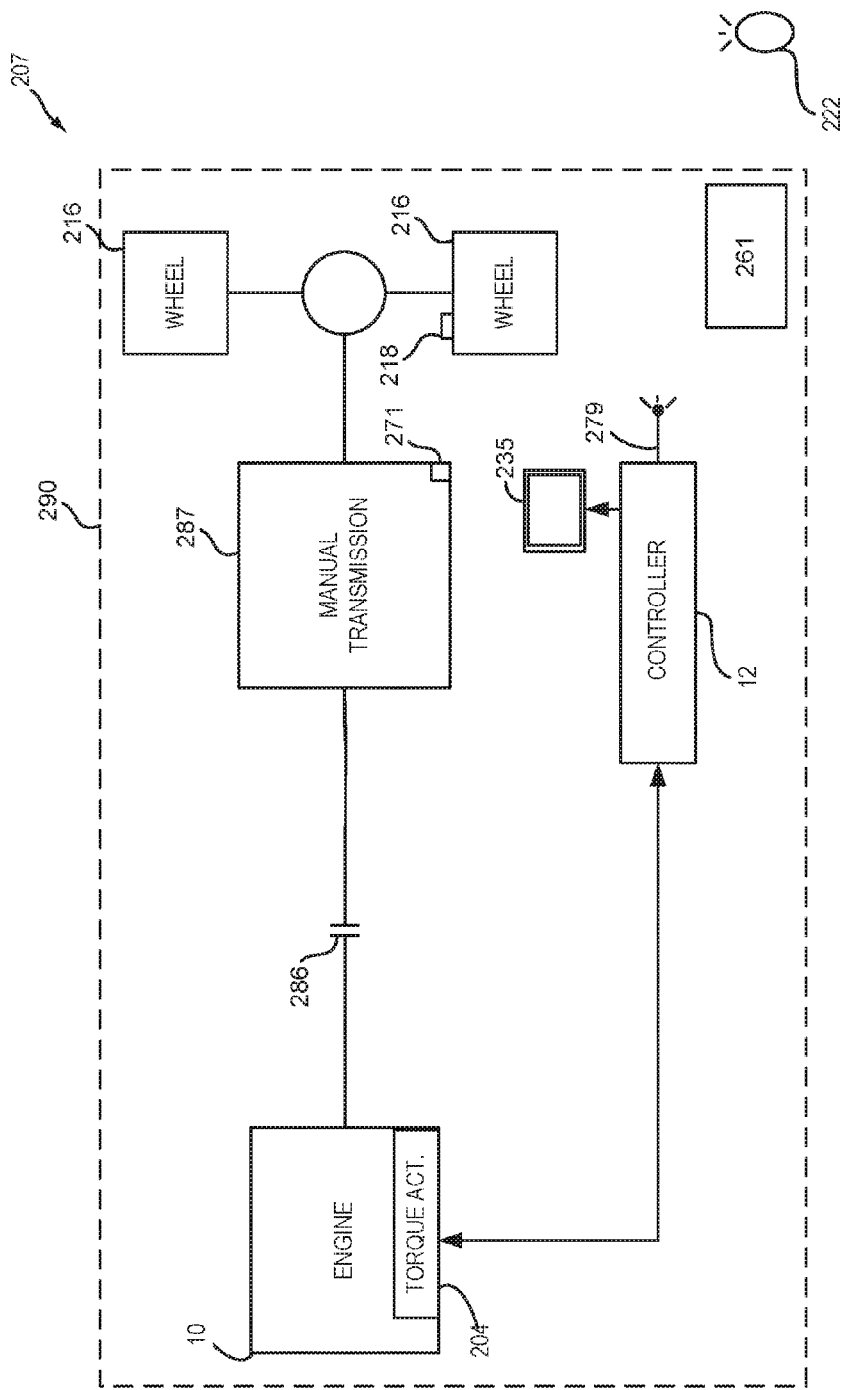
Figure 3A:
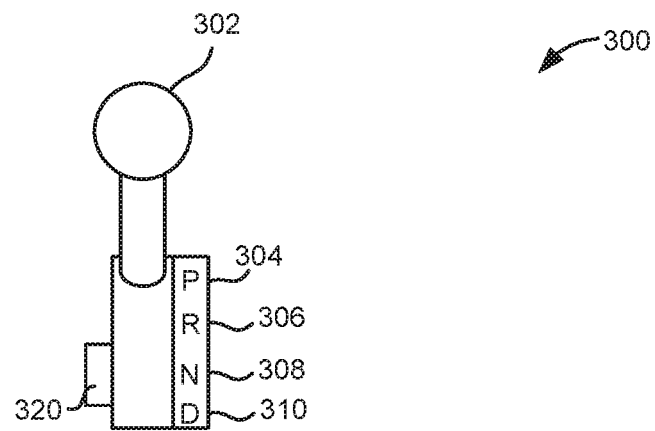
FIGS. 3A and 3B show example vehicle shifter configurations.
Figure 3B:
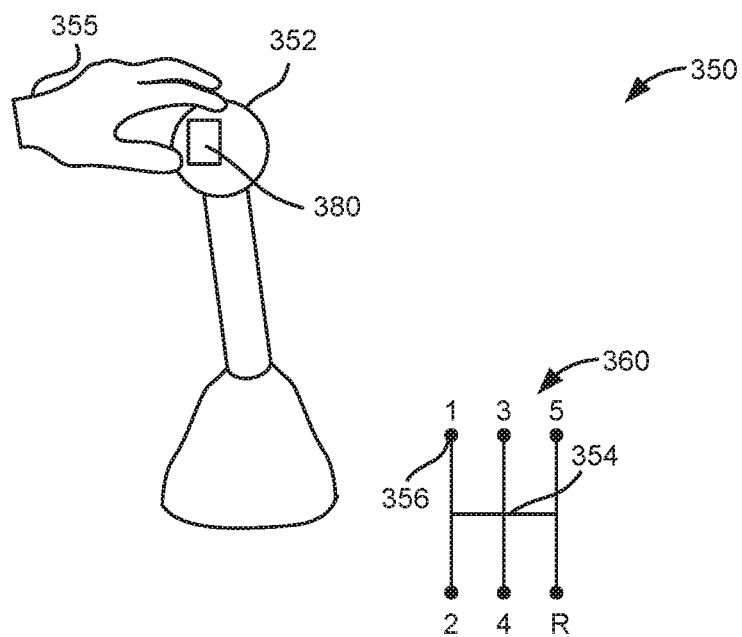
Figure 4:
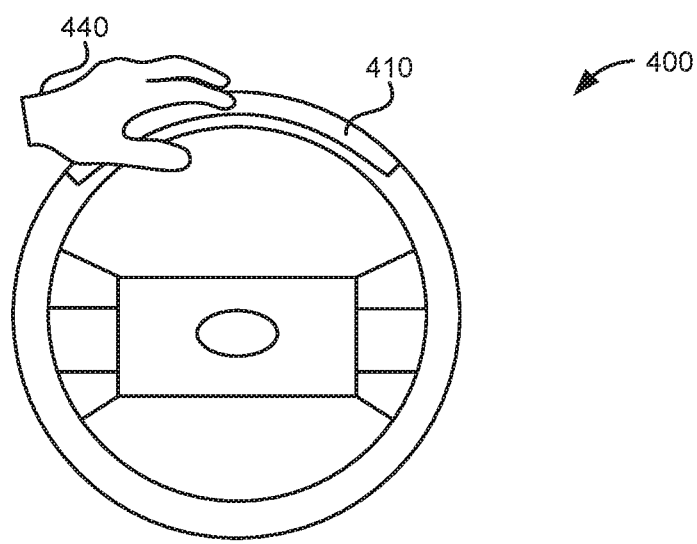
FIG. 4 shows an example vehicle steering wheel.

The present description is related to activating a vehicle for propulsion. Vehicle propulsion may be activated by starting an engine or supplying current to a motor so that the vehicle's source of propulsion may be made operational after the vehicle propulsion source is deactivated. The vehicle driveline may be comprised of an engine, as shown in FIG. 1, and a transmission without a motor as is shown in FIG. 2C. Alternatively, the vehicle driveline may be a hybrid vehicle driveline that includes an engine and a driveline integrated starter/generator or electric machine as shown in FIGS. 2A and 2B. The vehicle may include a shifter for an automatic transmission or a manually operated shifter as is shown in FIGS. 3A and 3B. The vehicle may also include a steering wheel as is shown in FIG. 4. The vehicle may be operated according to the method shown in FIG. 5 to reduce vehicle starting complexity.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transitory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a position or force sensor 154 coupled to brake pedal 150 for sensing force applied by driver 132; a position sensor 174 coupled to clutch pedal 170 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2A and 2B. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A is a block diagram of a vehicle driveline 200 and vehicle 290. Driveline 200 may be powered by engine 10. Engine 10 may be started with an engine starting system shown in FIG. 1 or via motor/generator 205. Further, engine 10 may generate or adjust torque via torque actuator 204, such as a fuel injector, throttle, camshaft, valve lift, etc.

Driveline 200 includes engine 10 and torque actuator 204. Torque actuator may be a throttle, valve timing actuator, ignition system, waste gate, or other actuator that may influence engine torque. Engine 10 provides torque to planetary gear set 202 and generator 205 operates in a speed control mode to control engine torque delivery to single ratio gearing system 210. Output from generator 205 provides electrical energy to energy storage device 208 and motor 206. Electrical energy storage device 208 may supply electrical power to motor 206 when engine 10 is not operating. Electrical energy storage device may be a battery, capacitor, or other electrical energy storage device. Motor 206 may also be operated in a generator mode for regenerative braking. Torque from engine 10 and motor 206 may be combined in single ratio gearing system 210 to provide torque to vehicle wheels 216 via a mechanical power path. Controller 12 controls operation of engine 10, generator 205, and motor 206 to adjust power supplied to vehicle wheels 216.

Electrical energy storage device 208 may be in electrical communication with charging system 235, and electrical receptacle 211 provides a way of electrically coupling vehicle 290 to stationary electrical power grid 299. Controller 12 may determine that stationary electrical power grid 299 is coupled to vehicle 290 and energy storage device 208 via voltage sensing circuitry 213 (e.g., a resistor network and an A/D converter) or an electrical connector pin detector 233. Voltage sensing circuitry 213 provides a voltage to controller 12 which indicates a presence (e.g., digital value of one) or absence (e.g., digital value of zero) of voltage from stationary power grid 299. Electrical connector pin detector 233 provides a voltage to controller 12 which indicates a presence (e.g., digital value of one) or absence (e.g., digital value of zero) of a pin from an electrical connector via displacing a plunger (not shown) within electrical connector pin detector 233.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from generator 204 and motor 206 by adjusting current flowing to and from field and/or armature windings of the motor/generators as is known in the art. Controller 12 may also determine a presence or absence of a driver via detecting a key fob or remote transmitting (e.g., polling device) 222 via antenna 279. In one example, remote transmitting device broadcasts a radio frequency code that identifies a driver in proximity to vehicle 290 or as being within the vehicle passenger cabin 261. Controller 12 may also output control parameters and vehicle status information via display 235.

Referring now to FIG. 2B, an alternative driveline 201 is shown. The driveline of FIG. 2B includes many of the same devices as described in FIG. 2A. Devices that have like numerical identifiers in FIGS. 2A and 2B are the same devices and operate in a same way. Therefore, for the sake of brevity, the description of same devices is omitted and a description of new devices is included.

In this driveline, engine 10 may be selectively coupled to motor/generator 285 via driveline disconnect clutch 280. Motor/generator 285 is coupled to automatic step-ratio transmission 288. Automatic transmission includes a torque converter (not shown) and gear clutches 289 (e.g., gears 1-N where N is an integer number between 4 and 25) for activating gears 283. The gear clutches 289 may be selectively engaged to propel vehicle 290 on a road. Torque output from the automatic transmission 288 may in turn be relayed to wheels 216. During vehicle launch conditions motor/generator may not be coupled to engine 10 so that vehicle 290 is propelled solely via motor/generator 285. However, during vehicle launch conditions where driver demand is high, engine and motor/generator 285 may be coupled together via driveline disconnect clutch 280. If motor/generator 285 is deactivated, engine 10 may be the sole source of propulsion for vehicle 290.

In some examples, disconnect clutch 280, motor/generator 285, energy storage device 208, charging system 235, receptacle 211, voltage sensing circuitry 213, and pin detector 233 may be omitted for a non-hybrid vehicle. Thus, engine 10 may be coupled to automatic transmission 288. Engine 10 may be the sole source of propulsion for vehicle 290.

Referring now to FIG. 2C, an alternative driveline 207 is shown. The driveline of FIG. 2C includes many of the same devices as described in FIG. 2A. Devices that have like numerical identifiers in FIGS. 2A and 2C are the same devices and operate in a same way. Therefore, for the sake of brevity, the description of same devices is omitted and a description of new devices is included.

In this driveline, engine 10 may be selectively coupled to manual transmission 287 via manually operated clutch 286. Manual transmission includes gears 271 (e.g., gears 1-N where N is an integer number between 4 and 10). The gears 271 may be selectively engaged to propel vehicle 290 on a road. Torque output from the manual transmission 287 may in turn be relayed to wheels 216.

The system of FIGS. 1-2C provides for a vehicle system, comprising: a propulsion source; and a controller including executable instructions stored in non-transitory memory to enable propulsion of a vehicle after propulsion of the vehicle is deactivated in response to confirming presence of a driver via a polling device, confirming more than a threshold force is applied to a brake pedal, and shifting a powertrain mode selector (e.g., a transmission shifter). The vehicle system includes where the powertrain mode selector is a manual gear shifter. The vehicle system includes where the powertrain mode selector is a forward or reverse selector. The vehicle system further comprises additional controller instructions to enable propulsion of the vehicle in response to confirmation of a driver gripping a steering wheel. The vehicle system includes where enabling propulsion of the vehicle includes supplying current to a motor of the vehicle. The vehicle system further comprises additional controller instructions to enable propulsion of the vehicle in response to confirmation of a driver gripping a shifter, and where the confirmation is provided via a sensor.

Referring now to FIG. 3A, a first example shifter 300 is shown. Shifter 300 includes a shift lever 302 that may be moved to park (P) 304, reverse (R) 306, neutral (N) 308, and drive (D) 310. Shifter 300 may include mechanical linkage that adjusts valve positions in an automatic transmission, or shifter 300 may output an electrical signal that is input to controller 12 and that indicates a driver desired propulsion mode (e.g., forward range gears 1-N, or reverse). In one example, shifter 300 outputs a different binary signal for each desired propulsion mode (e.g., 0000 for park, 0001 for reverse, 0011 for drive) and controller shifts the transmission via actuating various shift solenoids. In some examples, shifter 300 may include a movement limiting device 320 that restricts motion of shift lever 302 such that shift lever 302 is restricted from exiting park or neutral until the vehicle is not coupled to a stationary electrical grid. In one example, movement limiting device 320 is a solenoid that restricts motion of shift lever 302.

Referring now to FIG. 3B, an example manual shifter 350 is shown. In this example, shift lever 352 may be moved through positions 1-R of gear pattern 360. A driver may select neutral by placing shifter between gears as shown at 354. Shift lever 352 may engage a gear by being placed at a location indicated by a dot as shown at 356 where shift lever 352 engages first gear. A driver 355 may grasp shift lever 352 and manually engage the respective gears by adjusting the position of shift lever 352. In some examples, a sensor may detect the presence or absence of driver 355 via a pressure or capacitive sensor 380 located on shift lever 352.

Referring now to FIG. 4, an example steering wheel 400 is shown. Steering wheel 400 includes a sensor to detect the presence or absence of driver 440. In one example, sensor 410 may sense pressure applied by driver 440, or alternatively, sensor 410 may be a capacitive sensor that determines a change in capacitance caused by a driver gripping or releasing steering wheel 400.

Figure 5:
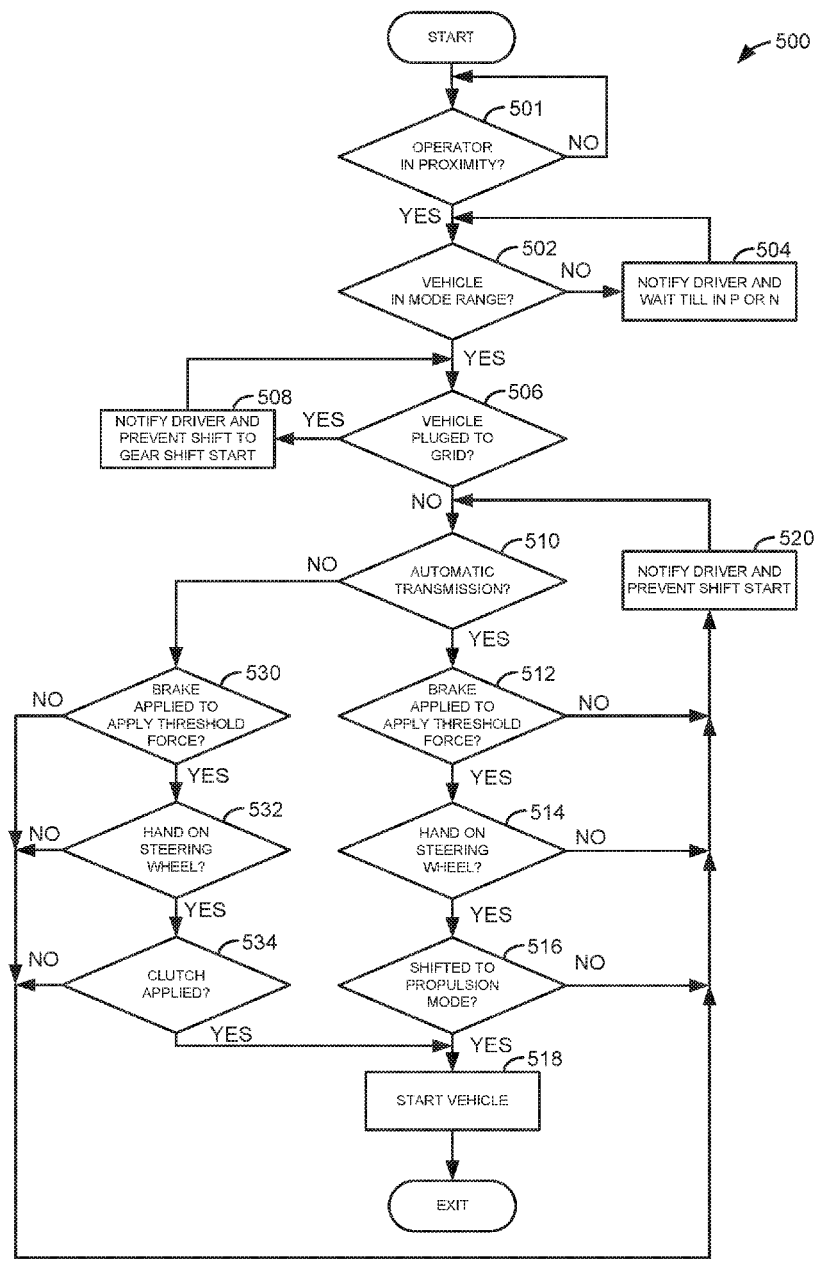
FIG. 5 is an example method for operating a vehicle.

Referring now to FIG. 5, a flowchart of a method for operating a vehicle is shown. At least portions of the method of FIG. 5 may be incorporated to controller 12 in the system of FIG. 1 as executable instructions stored in non-transitory memory. Further, portions of the method of FIG. 5 may be actions taken by controller 12 in the physical world to transform vehicle operating conditions. The method of FIG. 5 applies for a vehicle that a driver has stopped and left the vehicle's proximity. Thus, the vehicle's engine and/or motor stops rotating. The vehicle may or may not include automatic engine starting and stopping via a controller.

One or more of the steps (e.g., 514) shown in FIG. 5 may be omitted depending on the particular vehicle configuration and desired starting sequence. Vehicle propulsion may be enabled after only the remaining steps or operations are performed.

At 501, method 500 judges if an authorized user (e.g., driver or operator) is within proximity of the vehicle. In one example, controller 12 may broadcast a radio frequency signal that may be acknowledged by a transmitter or polling device 222. Transmitter 222 may respond to the broadcast by sending out a security code or sequence. If controller 12 receives a proper security code or sequence, the answer is yes and method 500 proceeds to 502. Otherwise, the answer is no and method 500 returns to 501.

At 502, method 500 judges if the vehicle is in a specific propulsion mode range. In one example, if the vehicle includes an automatic transmission or a single fixed ratio gear set, the specific propulsion mode range may be park or neutral. If the vehicle includes a step ratio transmission, gears of the transmission are not engaged in park or neutral. Further, a parking pall may engage a gear of the transmission to prevent vehicle motion if the vehicle is in park. If the transmission is a manual transmission, the specific propulsion mode range may be neutral, a forward gear, or a reverse gear. If the vehicle is in the specific propulsion mode range, the answer is yes and method 500 proceeds to 506. Otherwise, the answer is no and method 500 proceeds to 504.

At 504, method 500 provides an indication to the driver that the vehicle should be put into the specific propulsion mode range if vehicle starting is desired. The driver may be notified via a display device or an audible indication. Method 500 returns to 502 after a notification is provided to the driver.

At 506, method 500 judges if the vehicle is coupled to or in electrical communication with a stationary electrical power grid. The stationary electrical power grid may supply electrical charge to the vehicle. The electrical charge may propel the vehicle. In one example, method 500 may determine that the vehicle is coupled to a stationary power grid via an electrical connector pin detector or via voltage sensing circuitry. If method 500 judges that the vehicle is coupled to the stationary electrical power grid, the answer is yes and method 500 proceeds to 508. Otherwise, the answer is no and method 500 proceeds to 510.

At 508, method 500 provides an indication to the driver that the vehicle should be disconnected from the stationary power grid if vehicle starting is desired. The driver may be notified via a display device or an audible indication. Further, in some examples, the shifter may be prohibited from moving until the vehicle is decoupled from the stationary electrical power grid. Method 500 returns to 506 after a notification is provided to the driver.

At 510, method 500 judges if the vehicle includes an automatic transmission. The automatic transmission may be a step ratio transmission. In one example, a bit in stored in non-transitory memory may indicate the type of transmission included in the vehicle. If method 500 judges that the transmission is an automatic transmission, the answer is yes and method 500 proceeds to 512. Otherwise, the answer is no and method 500 proceeds to 530.

At 512, method 500 judges if the vehicle brakes have been applied with greater than a threshold amount of force. In one example, the threshold amount of force is greater than an amount of force to stop the vehicle from moving after an engine is started, engaged in a forward or reverse gear, and on a road grade greater than twenty percent. Thus, the threshold force may change depending on vehicle operating conditions. By judging if more than a threshold amount of braking force is applied to vehicle wheels, method 500 may judge if the braking force is sufficient to hold the vehicle still during vehicle starting. If method 500 judges that the brake force applied is greater than the threshold, the answer is yes and method 500 proceeds to 514. Otherwise, the answer is no and method 500 proceeds to 520.

At 514, method 500 judges if a driver is grasping a steering wheel of the vehicle. In one example, a driver may be judged to be grasping the vehicle's steering wheel if a steering wheel sensor indicates a driver's grasp via a voltage or current. By judging if a driver is grasping a steering wheel, method 500 may judge a threshold level of vehicle control is being applied by a driver. If method 500 judges that a driver is grasping the steering wheel, the answer is yes and method 500 proceeds to 516. Otherwise, the answer is no and method 500 proceeds to 520. In some examples, 514 may be omitted as previously stated.

At 516, method 500 judges if the vehicle has been shifted into a predetermined propulsion mode. For example, method 500 judges if the vehicle transmission has been shifted from park or neutral into drive or reverse. Alternatively, method 500 may judge if the transmission has been shifted from park or neutral into a forward gear (e.g., first gear). If so, the answer is yes and method 500 proceeds to 518. Otherwise, the answer is no and method 500 proceeds to 520. The vehicle propulsion source may be the engine, the motor, or the motor and the engine.

At 518, method 500 starts the vehicle. For vehicles that include an engine, starting may include rotating an engine that had stopped rotating before engine starting has begun and combusting air and fuel within the rotating engine. For hybrid or electric vehicles, starting may include supplying current and voltage to a motor. Propulsion of the vehicle is enabled via starting the engine and/or the motor. The engine and/or motor are started before method 500 exits.

At 520, method 500 notifies the driver of conditions that may be needed to start the vehicle. For example, the driver may be notified that additional brake force is to be applied before the vehicle is to be started. Further, the driver may be notified that the vehicle is to be shifted into a specific propulsion mode (e.g., drive) before the vehicle is started. Method 500 returns to 510 after notification is provided to the driver.

At 530, method 500 judges if the vehicle brakes have been applied with greater than a threshold amount of force. If method 500 judges that the brake force applied is greater than the threshold, the answer is yes and method 500 proceeds to 532. Otherwise, the answer is no and method 500 proceeds to 520.

At 532, method 500 judges if a driver is grasping a steering wheel of the vehicle. If method 500 judges that a driver is grasping the steering wheel, the answer is yes and method 500 proceeds to 532. Otherwise, the answer is no and method 500 proceeds to 520.

At 534, method 500 judges if the vehicle's clutch pedal has been applied to open the vehicle's manual clutch. For example, method 500 judges if the vehicle's clutch has been applied so that the engine is not started while the transmission is in a forward or reverse gear. In addition, method 500 may judge if the driver is gripping the shifter to indicate that the driver has asserted a desired level of control. Further, in some examples, the answer may be yes if the manual shifter is shifted into a forward or reverse gear while the clutch is applied. If the one or more predetermined conditions are met, the answer is yes and method 500 proceeds to 518. Otherwise, the answer is no and method 500 proceeds to 520.

Thus, the method of FIG. 5 provides for a method for enabling vehicle propulsion, comprising: enabling propulsion of a vehicle after propulsion of the vehicle is deactivated in response to confirming presence of a driver via a remote device, confirming more than a threshold force is applied to a brake pedal, and shifting the vehicle from park or neutral into a forward or reverse propulsion mode. The method includes where enabling propulsion of the vehicle includes starting an engine of the vehicle, and where propulsion of the vehicle is enabled in response to only confirmed presence of the driver, confirmed force applied to the brake pedal, and the vehicle being shifted from park or neutral into forward or reverse propulsion mode. The method includes where enabling propulsion of the vehicle includes supplying current to a motor of the vehicle. The method includes where the forward or reverse propulsion mode includes operating a transmission in a forward gear or a reverse gear.

In some examples, the method further comprises enabling propulsion of the vehicle in response to confirmation of a driver gripping a steering wheel. The method includes where the threshold force applied to the brake pedal is a force sufficient to stop vehicle motion. The method further comprises notifying a driver of one or more conditions for enabling propulsion of the vehicle are not met.

The method of FIG. 5 also provides for a method for enabling vehicle propulsion, comprising: enabling propulsion of a vehicle after propulsion of the vehicle is deactivated in response to confirming presence of a driver via a polling device, confirming more than a threshold force is applied to a brake pedal, and confirming that the vehicle is not coupled to a power grid. The method includes where confirmation that the vehicle is not coupled to a power grid is provided via an electrical connector pin sensor, and where propulsion of the vehicle is enabled in response to only confirmed presence of the driver, confirmed force applied to the brake pedal, confirming shifting the vehicle from park or neutral into a forward or reverse propulsion mode, and confirming that the vehicle is not coupled to the power grid. The method includes where confirmation that the vehicle is not coupled to a power grid is provided via voltage sensing circuitry.

In some examples, the method further comprises enabling propulsion of the vehicle responsive to shifting the vehicle from park or neutral into a forward or reverse propulsion mode. The method also includes where enabling propulsion of the vehicle includes starting an engine of the vehicle. The method includes where enabling propulsion of the vehicle includes supplying current to a motor of the vehicle. The method further comprises enabling propulsion of the vehicle in response to confirmation of a driver gripping a steering wheel.

As will be appreciated by one of ordinary skill in the art, method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for enabling vehicle propulsion, comprising: enabling propulsion of a vehicle after propulsion of the vehicle is deactivated in response to confirming presence of a driver via a key fob, confirming more than a threshold force is applied to a brake pedal, and shifting the vehicle from park or neutral into a forward or reverse propulsion mode,
where the threshold force applied to the brake pedal is a force sufficient to stop vehicle motion.

2. The method of claim 1, where enabling propulsion of the vehicle includes starting an engine of the vehicle, and where propulsion of the vehicle is only enabled in response to confirmed presence of the driver, confirmed force applied to the brake pedal, and the vehicle being shifted from park or neutral into forward or reverse propulsion mode.

3. The method of claim 1, where enabling propulsion of the vehicle includes supplying current to a motor of the vehicle.

4. The method of claim 1, where the propulsion of the vehicle is enabled without receiving an input to a start button.

5. The method of claim 1, further comprising enabling propulsion of the vehicle in response to confirmation of a driver gripping a steering wheel.

6. The method of claim 1, where the propulsion of the vehicle is enabled without receiving an input to a key switch.

7. A method for enabling vehicle propulsion, comprising: without receiving an input to a start button and without receiving an input to a key switch, enabling propulsion of a vehicle after propulsion of the vehicle is deactivated in response to confirming presence of a driver via a polling device, confirming more than a threshold force is applied to a brake pedal, and confirming that the vehicle is not coupled to a power grid.

8. The method of claim 7, where confirmation that the vehicle is not coupled to a power grid is provided via an electrical connector pin sensor, and where propulsion of the vehicle is enabled in response to only confirmed presence of the driver, confirmed force applied to the brake pedal, confirming shifting the vehicle from park or neutral into a forward or reverse propulsion mode, and confirming that the vehicle is not coupled to the power grid.

9. The method of claim 7, where confirmation that the vehicle is not coupled to a power grid is provided via an electrical grid power sensor.

10. The method of claim 7, further comprising enabling propulsion of the vehicle responsive to shifting the vehicle from park or neutral into a forward or reverse propulsion mode.

11. The method of claim 7, where enabling propulsion of the vehicle includes starting an engine of the vehicle.

12. The method of claim 7, where enabling propulsion of the vehicle includes supplying current to a motor of the vehicle.

13. The method of claim 7, further comprising enabling propulsion of the vehicle in response to confirmation of a driver gripping a steering wheel.

14. A vehicle system, comprising:
a propulsion source; and
a controller including executable instructions stored in non-transitory memory to, without an input received at a start button and without an input received at a key switch, enable propulsion of a vehicle after propulsion of the vehicle is deactivated responsive to confirming presence of a driver via a key fob, confirming more than a threshold force applied to a brake pedal, and shifting a powertrain mode selector.

15. The vehicle system of claim 14, where the powertrain mode selector is a manual gear shifter.

16. The vehicle system of claim 14, where the powertrain mode selector is a forward or reverse selector.

17. The vehicle system of claim 14, further comprising additional controller instructions to enable propulsion of the vehicle in response to confirmation of a driver gripping a steering wheel.

18. The vehicle system of claim 17, where enabling propulsion of the vehicle includes supplying current to a motor of the vehicle.

19. The vehicle system of claim 18, further comprising additional controller instructions to enable propulsion of the vehicle in response to confirmation of a driver gripping a shifter.

20. A method for enabling vehicle propulsion, comprising:
enabling propulsion of a vehicle after propulsion of the vehicle is deactivated in response to confirming presence of a driver via a key fob, confirming more than a threshold force is applied to a brake pedal, and shifting the vehicle from park or neutral into a forward or reverse propulsion mode; and
enabling propulsion of the vehicle in response to confirmation of a driver gripping a steering wheel.

* * * * *